(12) United States Patent
Ohta

(10) Patent No.: US 10,955,436 B2
(45) Date of Patent: Mar. 23, 2021

(54) SCANNING PROBE MICROSCOPE

(71) Applicant: Shimadzu Corporation, Kyoto (JP)

(72) Inventor: Masahiro Ohta, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 16/475,407

(22) PCT Filed: Feb. 22, 2018

(86) PCT No.: PCT/JP2018/006481
§ 371 (c)(1),
(2) Date: Jul. 2, 2019

(87) PCT Pub. No.: WO2018/155563
PCT Pub. Date: Aug. 30, 2018

(65) Prior Publication Data
US 2020/0003800 A1 Jan. 2, 2020

(30) Foreign Application Priority Data
Feb. 22, 2017 (JP) .............................. JP2017-031447

(51) Int. Cl.
*G01Q 20/02* (2010.01)
*G01Q 30/06* (2010.01)

(52) U.S. Cl.
CPC ............. *G01Q 20/02* (2013.01); *G01Q 30/06* (2013.01)

(58) Field of Classification Search
USPC .......................................................... 850/6
See application file for complete search history.

(56) References Cited

U.S. PATENT DOCUMENTS

| 5,467,642 A | * | 11/1995 | Hosaka | B82Y 35/00 73/105 |
| 7,973,942 B2 | * | 7/2011 | Iyoki | G01Q 20/02 356/614 |

FOREIGN PATENT DOCUMENTS

| JP | 2005-283433 A | 10/2005 |
| JP | 2011-33482 A | 2/2011 |
| JP | 5283038 B2 | 9/2013 |

OTHER PUBLICATIONS

International Search Report and Written Opinion dated May 15, 2018 of corresponding application No. PCT/JP2018/006481; 9 pgs.

* cited by examiner

Primary Examiner — Phillip A Johnston
(74) Attorney, Agent, or Firm — Maier & Maier, PLLC

(57) ABSTRACT

A scanning probe microscope including a measurement light-casting section configured to cast light onto a reflective surface provided on a movable end of a cantilever; a light-detecting section configured to detect reflected light from the reflective surface with a light-receiving surface having a larger area than the incident area of the reflected light, the light-receiving surface divided into a plurality of areas; a deflection-calculating section configured to determine at preset intervals, the amount of deflection of the cantilever based on the proportion of the amounts of light incident on the plurality of areas while the distance between the base end and the sample is changed; a determining section configured to determine whether or not the amount of change in the deflection of the cantilever is equal to or larger than a previously determined threshold $K_{th}$.

3 Claims, 3 Drawing Sheets

SCANNING PROBE MICROSCOPE

FIELD

The present invention relates to a scanning probe microscope (SPM) for obtaining information on the surface of a sample by scanning the same surface with a probe.

BACKGROUND

In the scanning probe microscope, the tip of a micro-sized probe is positioned in proximity to the surface of a sample, and a mechanical and electromagnetic interaction between the probe and the sample is detected while the surface of the sample is scanned with the probe. The data obtained by the scan is fed to a data processing device for a scanning probe microscope to be subjected an analysis on the shape and physical properties of the sample surface.

FIG. 1 shows the configuration of the main components of a scanning probe microscope. This scanning probe microscope includes a measurement unit 101 and a control-and-processing unit 102. The measurement unit 101 operates based on the control signals from the control-and-processing unit 102. The measurement data obtained by the measurement unit 101 are sequentially sent to the control-and-processing unit 102 and subjected to an analysis.

In the measurement unit 101, a sample 110 to be subjected to a measurement is placed on a sample stage 111 mounted on a scanner 112. The scanner 112 includes an XY scanner 1121 for driving the sample stage 111 in the two directions of X and Y axes which are orthogonal to each other in a horizontal plane, as well as a Z scanner 1122 for driving the sample stage 111 in the Z-axis direction (vertical direction) which is orthogonal to both the X and Y axes. The XY scanner 1121 and the Z scanner 1122 are each driven with a piezoelectric element (not shown) which operates based on a control signal from the control-and-processing unit 102.

A flexible cantilever 115 having a probe 116 at its tip (movable end) is located above the scanner 112. The base end of the cantilever 115 is fixed. A reflective surface is formed on the movable end of the cantilever 115 on the opposite side from the probe 116 in order to detect the deflection of the cantilever 115. An optical displacement detector section 117 including a laser source 1171, half mirror 1172, mirror 1173 and photodetector 1174 is provided above this reflective surface. In the optical displacement detector section 117, a beam of laser light from the laser source 1171 is reflected downward by the half mirror 1172. The reflected light travels in a substantially vertical direction and strikes the reflective surface of the cantilever 115. After being reflected by this reflective surface, the laser light falls onto the photodetector 1174 via the mirror 1173. The photodetector 1174 is a four-segment photodetector having a light-receiving surface divided into four segments, for example. A deflection of the cantilever 115 changes the angle of the reflective surface, which in turn changes the proportion of the amounts of light incident on the four light-receiving segments. The output signals of the photodetector 1174 are sent to the control-and-processing unit 102. The control-and-processing unit 102 computationally processes the detection signals which correspond to the proportion of the amounts of light incident on the light-receiving segments of the photodetector 1174, to calculate the amount of deflection (i.e. the amount of displacement of the tip portion) of the cantilever 115.

One of the measurement modes in the scanning probe microscope is a contact mode. In this measurement mode, for example, the sample stage 111 is lifted by the scanner 112 to make the surface of the sample 110 gradually move closer to the probe 116, and the amount of deflection of the cantilever 115 is measured during the upward motion. This measurement yields an approach line which expresses the relationship between the amount of deflection of the cantilever 115 and the distance of the surface of the sample 110 from the base end of the cantilever 115. A release line is also similarly obtained by measuring the amount of deflection of the cantilever 115 while making the surface of the sample 110 gradually move farther from the probe 116 (for example, see Patent Literature 1). The combination of the approach line and the release line is called a "force curve".

Another measurement mode in the scanning probe microscope is a dynamic mode. In the dynamic mode, for example, the surface of the sample 110 is scanned with the probe 116 positioned in proximity to the surface while the cantilever 115 is vibrated at a predetermined frequency. By this measurement, a change in the frequency of the vibration of the cantilever 115 due to the interaction with the sample 110 is measured (for example, see Patent Literature 2).

Patent Literature 1: JP 2005-283433 A
Patent Literature 2: JP 2011-33482 A

SUMMARY

As described in Patent Literature 2, there are additional factors which affect the motion of the cantilever 115 in the measurement of a sample 110 using a scanning probe microscope other than the mechanical and electromagnetic interaction (short-range force) which occurs when the distance between the probe 116 and the sample 110 is as small as a few nanometers. Examples of such factors include a temperature change in the measurement environment, heat generation due to the laser light incident on the reflective surface of the cantilever 115, and electrostatic force (long-range force) which acts between the probe 116 and the sample 110 when their distance is a few micrometers. Patent Literature 2 discloses the idea of removing the influence of those factors in the dynamic mode by adding an offset (frequency) to a threshold every time the change in the vibration frequency of the cantilever 115 exceeds the previously determined threshold.

In the contact mode, a change in the amount of deflection of the cantilever 115 due to the aforementioned factors causes the light reflected by the reflective surface of the cantilever 115 to change its incident position on the light-receiving surface of the photodetector 1174. If this change continues, the reflected light which has initially been incident on the central area of the light-receiving surface as shown in FIG. 2A, for example, will eventually be incident on only one of the light-receiving segments, as shown in FIG. 2B. As described earlier, this photodetector 1174 produces detection signals which correspond to the proportion of the amounts of light incident on the light-receiving segments, and those signals are computationally processed to calculate the amount of deflection of the cantilever 115. When the reflected light is incident on only one of the light-receiving segments, it is impossible to determine the amount of deflection of the cantilever 115.

The problem to be solved by the present invention is to provide a scanning probe microscope capable of correctly measuring the mechanical and electromagnetic interaction (short-range force) between the probe and the sample even in the case where a deflection of the cantilever occurs due to a temperature change in the measurement environment or other unwanted factors in a measurement of the sample.

The present invention developed for solving the previously described problem is a scanning probe microscope configured to scan the surface of a sample with a probe provided at a movable end of a flexible cantilever having the movable end and a base end as both ends, the scanning probe microscope including:

a) a measurement light-casting section configured to cast light onto a reflective surface provided on the movable end;

b) a light-detecting section configured to detect reflected light from the reflective surface with a light-receiving surface having a larger area than the incident area of the reflected light, the light-receiving surface divided into a plurality of areas;

c) a deflection-calculating section configured to determine, at preset intervals, the amount of deflection of the cantilever based on the proportion of the amounts of light incident on the plurality of areas while the distance between the base end and the sample is changed;

d) a determining section configured to determine whether or not the amount of change in the deflection of the cantilever is equal to or larger than a previously determined threshold; and e) an incident position-changing section configured to change the incident position of the reflected light on the light-receiving surface so as to offset the amount of change when the amount of change is smaller than the threshold.

For example, the incident position-changing section may be a light-receiving surface drive section configured to change the position of the light-receiving surface. Another example is an optical element drive section configured to change the position of an optical element located between the reflective surface and the light-receiving surface.

The target of the measurement with a scanning probe microscope is a mechanical and electromagnetic interaction (short-range force) between the probe provided at the movable end of the cantilever and the sample. Such a short-range force does not act while the base end of the cantilever is distant from the sample surface. This force suddenly begins to act as soon as the distance is reduced to a few nanometers. This force also causes a significant amount of change in the deflection of the cantilever when the distance between the base end and the sample is changed. By comparison, the amount of change in the deflection caused by a temperature change in the measurement environment, heat generation due to the laser light incident on the reflective surface of the cantilever or other similar factors is independent of a change in the distance between the base end of the cantilever and the sample. Meanwhile, the amount of change in the deflection relative to a change in the distance between the base end of the cantilever and the sample due to the electrostatic force (or other kinds of long-range force) which acts between the sample and the cantilever is smaller than the amount of change due to the short-range force. Accordingly, it is possible to remove the amount of change in the deflection of the cantilever due to unwanted factors and correctly measure the mechanical and electromagnetic force (short-range force) between the probe of the cantilever and the sample by determining the threshold so that only the amount of change in the deflection due to the short-range force will be identified as valid, and changing the position of the light-receiving surface so as to offset the amount of change in the deflection of the cantilever when the amount of change is smaller than the threshold.

As one example, the scanning probe microscope according to the present invention may be configured as follows:

the deflection-calculating section is configured to periodically determine the amount of deflection of the cantilever with a first period; and the determining section is configured to periodically determine, with a second period longer than the first period, whether or not the amount of change in the deflection of the cantilever is equal to or larger than the previously determined threshold.

With the scanning probe microscope according to the present invention, it is possible to correctly measure the mechanical and electromagnetic interaction (short-range force) between the probe and the sample even in the case where a deflection of the cantilever occurs due to a temperature change in the measurement environment or other unwanted factors in a measurement of the sample.

DETAILED DESCRIPTION

An embodiment of the scanning probe microscope according to the present invention is hereinafter described with reference to the attached drawings.

Figure 1:
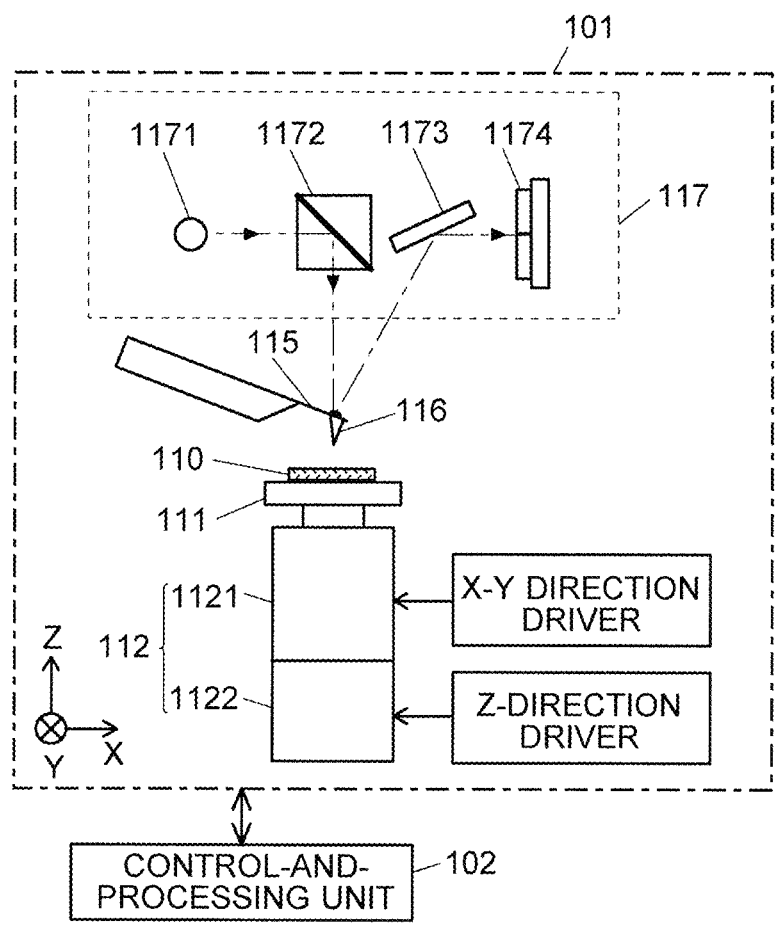
FIG. 1 is a configuration diagram of the main components of a conventional scanning probe microscope.
Figure 2A:
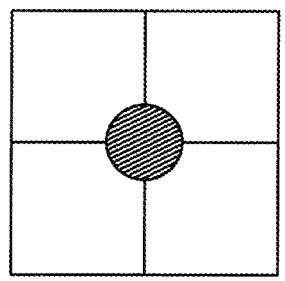
FIGS. 2A and 2B are diagrams illustrating the incident position of a light beam falling from the reflective surface of a cantilever onto the light-receiving surface of a photodetector.
Figure 2B:
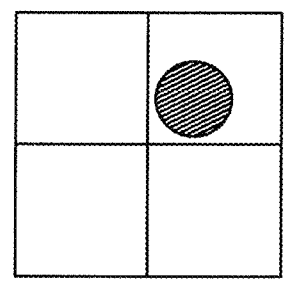
Figure 3:
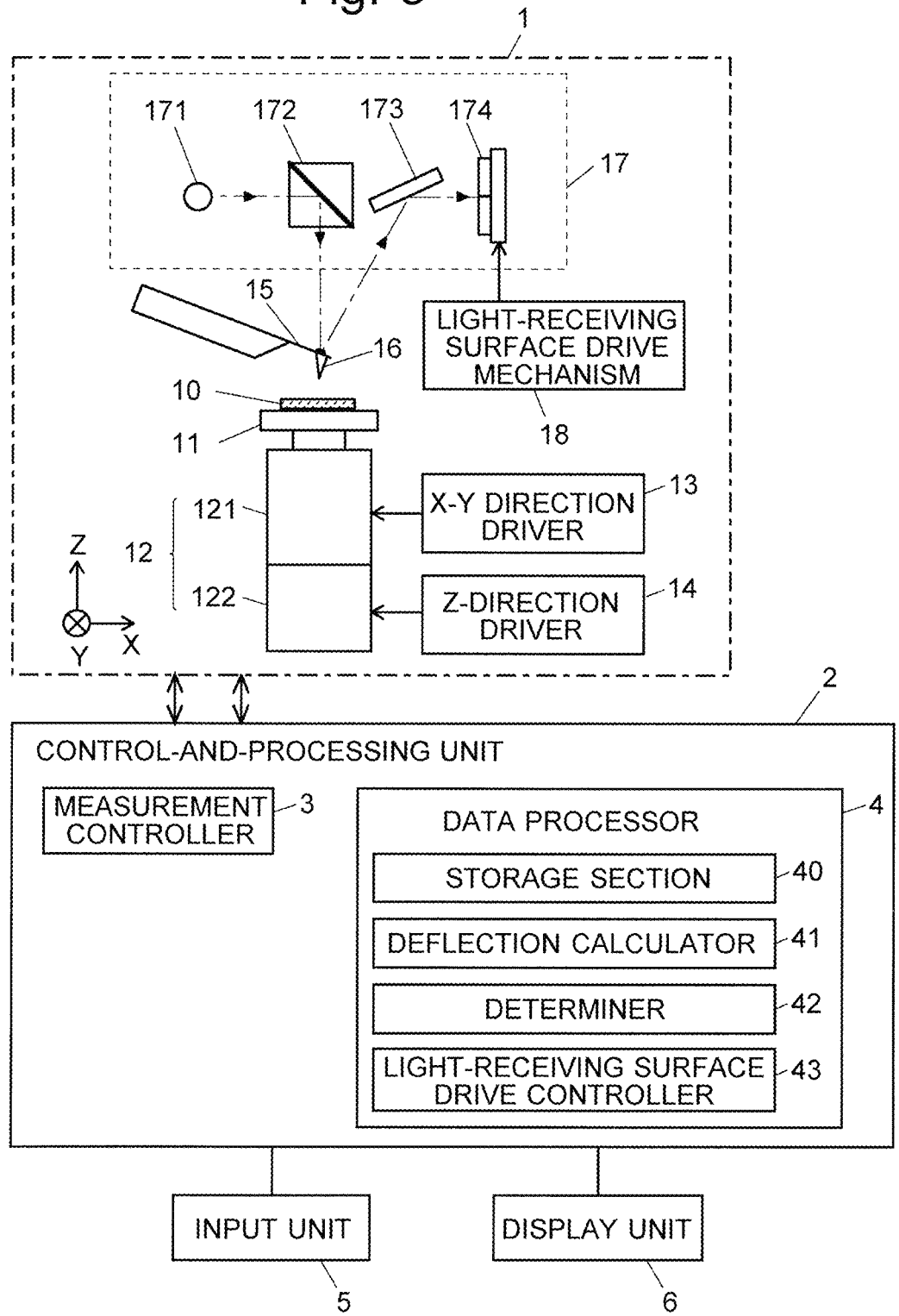
FIG. 3 is a configuration diagram of the main components of one embodiment of the scanning probe microscope according to the present invention.

FIG. 3 is a configuration diagram of the main components of the scanning probe microscope according to the present embodiment. This scanning probe microscope includes a measurement unit 1 and a control-and-processing unit 2. The control-and-processing unit 2 includes a measurement controller 3 and a data processor 4. The control-and-processing unit 2 is actually a personal computer having a configuration and functional blocks which will be described later. An input unit 5 and a display unit 6 are connected to the control-and-processing unit 2.

In the measurement unit 1, a sample 10 to be subjected to the measurement is placed on a sample stage 11 mounted on a scanner 12. The scanner 12 includes an XY scanner 121 for driving the sample stage 11 in the two directions of X and Y axes which are orthogonal to each other in a horizontal plane, as well as a Z scanner 122 for driving the sample stage 11 in the Z-axis direction (vertical direction) which is orthogonal to both the X and Y axes. The XY scanner 121 and the Z scanner 122 are each driven with a piezoelectric element (not shown) which operates based on a control signal from the measurement controller 3.

A flexible cantilever 15 having a probe 16 at its tip is located above the sample 10 (at a position which is separated in the Z-axis direction in the present embodiment). In order to detect a displacement of the tip of the cantilever 15 in the Z-axis direction, an optical displacement detector section 17 including a laser source 171, half mirror 172, mirror 173 and photodetector 174 is located above the cantilever 15. The light-receiving surface of the photodetector 174 is configured so that its position can be changed by a light-receiving surface drive mechanism 18 including a piezoelectric element (not shown) as a drive source.

In the optical displacement detector section 17, a beam of laser light from the laser source 171 is reflected downward by the half mirror 172. The reflected light travels in a substantially vertical direction and strikes a reflective surface formed on the back side of the tip of the cantilever 15. After being reflected by this reflective surface, the laser light falls onto the photodetector 174 via the mirror 173. The photodetector 174 is a four-segment photodetector having a light-receiving surface divided into four segments arrayed in the Z-axis and Y-axis directions. The output signals of the photodetector 174 are sent to a deflection calculator 41 (which will be described later).

The measurement controller 3 is primarily configured to control the measurement operations of the measurement unit 1. Based on the various measurement conditions entered by a user, the measurement controller 3 drives the scanner 12 to scan the surface of the sample with the cantilever 15 and obtain data of a force curve including an approach line and a release line at each measurement point on the surface of the sample 10. The data obtained through the measurement are saved in a storage section 40 of the data processor 4.

The data processor 4 includes a deflection calculator 41, determiner 42 and light-receiving surface drive controller 43 as its functional blocks in addition to the storage section 40. The light-receiving surface drive mechanism 18 and the light-receiving surface drive controller 43 in the present embodiment correspond to the incident position-changing section in the present invention. Those functional blocks are embodied by a CPU executing a data-processing program in the computer configured to act as the control-and-processing unit 2. In the storage section 40, the maximum value $K_{max}$ of the amount of deflection of the cantilever 15 and the threshold $K_{th}$ of the amount of change in the deflection of the cantilever 15 are previously stored for use in the operation which will be described later.

A measurement operation in the scanning probe microscope according to the present embodiment is hereinafter described. The following description deals with an example in which approach-line data constituting a force curve is obtained with the scanning probe microscope operated in a contact mode.

In response to a command issued by a user to initiate a measurement, the measurement controller 3 sends control signals to an X-Y direction driver 13 to transfer the probe 16 to a position above the measurement position on the surface of the sample 10. The measurement controller 3 subsequently sends electric signals to a Z-direction driver 14 to make the sample stage 11 move upward at a previously determined constant speed. With this motion, the distance between the base end 10 of the cantilever 15 and the sample 10 gradually decreases. The probe 16 provided on the cantilever 15 gradually comes closer to the surface of the sample 10.

During the upward motion of the sample stage 11, the deflection calculator 41 determines the amount of deflection of the cantilever 15 and the direction of deflection based on the output signals from the photodetector 174 with a first frequency (200 kHz). Specifically, the amount and direction of the deflection are determined from the proportion of the amounts of light respectively received by the four light-receiving segments. Every time the amount of deflection of the cantilever 15 is determined by the deflection calculator 41 (i.e. with the first period), the determiner 42 determines whether or not the amount of deflection has reached the maximum value $K_{max}$ stored in the storage section 40. The maximum value $K_{max}$ is the value used for confirming that the tip of the probe 16 has reached the surface of the sample.

Specifically, the maximum value $K_{max}$ is set to be equal to the amount of deflection of the cantilever 15 measured under the condition that the cantilever 15 is in a slightly warped form with the tip of the probe 16 pressed onto the surface of the sample 10 after the tip has reached the surface of the sample 10.

If the amount of deflection of the cantilever 15 has not yet reached the maximum value $K_{max}$, the measurement controller 3 continues driving the sample stage 11 upward. As soon as the amount of deflection of the cantilever 15 has reached the maximum value $K_{max}$, the upward driving of the sample stage 11 is discontinued, and the acquisition of the approach-line data is completed.

The determiner 42 also determines, with a second frequency (20 kHz) longer than the first period, whether or not the amount of change in the deflection of the cantilever 15 has been equal to or larger than the previously determined threshold $K_{th}$. In the present embodiment, as noted earlier, the sample stage 11 is configured to be driven upward at a constant speed. The threshold $K_{th}$ is previously set to be equal to the amount of change corresponding to the distance covered by this motion of the sample stage 11 within a period of time corresponding to 20 kHz (50 μs). Accordingly, the determination on the amount of change in the deflection of the cantilever 15 can be made based on whether the amount of change from the previous determination has exceeded the threshold $K_{th}$ stored in the storage section 40.

The threshold $K_{th}$ used for the determination is previously determined based on the result of a preliminary measurement (or the like) so that its value is larger than the amount of change in the deflection caused by a temperature change in the measurement environment, heat generation due to the laser light incident on the reflective surface of the cantilever or other similar factors, while the same value is smaller than the amount of change in the deflection due to the mechanical and electromagnetic interaction (short-range force) between the probe 16 and the sample 10. Accordingly, whether or not the calculated deflection of the cantilever 15 is due to the short-range force acting between the sample 10 and the probe 16 can be determined by the previously described determination method.

If the determiner 42 has determined that the amount of change in the deflection of the cantilever 15 is above the threshold $K_{th}$, the deflection of the cantilever 15 is due to the short-range force between the probe 16 and the sample 10. Accordingly, the value of the amount of deflection of the cantilever 15 is stored in the storage section 40 as a piece of valid data constituting the approach line.

On the other hand, if the determiner 42 has determined that the amount of change in the deflection of the cantilever 15 is not above the threshold $K_{th}$, the deflection of the cantilever 15 is considered to have resulted from such factors as a temperature change in the measurement environment or heat generation due to the laser light incident on the reflective surface of the cantilever (those factors are hereinafter collectively called the "external factor"). In such a case, the light-receiving surface drive controller 43 sends control signals to the light-receiving surface drive mechanism 18 via the measurement controller 3 to change the position of the light-receiving surface so that the reflected light from the reflective surface of the cantilever 15 will be incident on the central area of the segmented light-receiving surface of the photodetector 174. In other words, the position of the light-receiving surface is changed to offset the amount of deflection of the cantilever 15.

Figure 4:
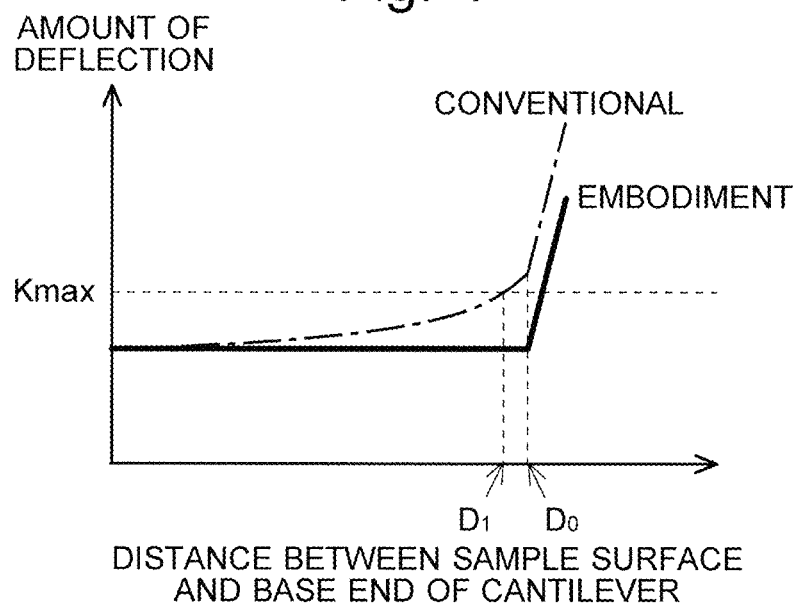
FIG. 4 is a diagram illustrating one example of the deflection of the cantilever.

Now, consider the case where the deflection of the cantilever 15 due to the external factor is continuously increasing during the measurement, as shown by the long dash short dash line in FIG. 4. In a conventional scanning probe microscope, such a continuous increase in the deflection of the cantilever 15 due to the external factor will cause the amount of deflection of the cantilever 15 to reach the maximum value $K_{max}$ before the tip of the probe 16 reaches the surface of the sample 10 (at the point where the distance between the base end of the cantilever 15 and the surface of the sample 10 is $D_1$). Consequently, the tip of the probe 16 will be incorrectly judged to have reached the surface of the sample 10, so that the correct approach-line data cannot be obtained.

By comparison, in the scanning probe microscope according to the present embodiment, if the deflection of the cantilever 15 is continuously increasing due to an external factor during the measurement, the amount of that deflection can be offset by changing the position of the light-receiving surface of the photodetector 174 in the previously described manner, so that the amount of deflection of the cantilever 15 can be recorded as shown by the solid line in FIG. 4. Accordingly, the point where the tip of the probe 16 reaches the surface of the sample 10 (the point where the distance between the base end of the cantilever 15 and the surface of the sample 10 is $D_0$) can be correctly detected.

The previous embodiment is a mere example and can be appropriately changed in accordance with the spirit of the present invention.

In the previous embodiment, the sample stage 11 is driven to change the distance between the base end of the cantilever 15 and the surface of the sample 10. Alternatively, the cantilever 15 may be driven while the sample stage 11 is fixed. The first and second periods in the previous embodiment correspond to 200 kHz and 20 kHz, respectively. These periods can be appropriately set according to the moving speed of the sample stage 11 (or cantilever 15). It should be noted that the second period must be longer than the first period.

In the previous embodiment, the light-receiving surface drive mechanism 18 and the light-receiving surface drive controller 43 are used as the incident position-changing section. Another possible configuration is to change the incident position of the reflected light on the light-receiving surface by changing the position of an optical element located between the reflective surface of the cantilever 15 and the light-receiving surface of the photodetector 174. For example, such a system can be configured by a mirror driver for rotating the mirror 173 and a mirror drive controller for controlling the mirror driver.

The invention claimed is:

1. A scanning probe microscope configured to scan a surface of a sample with a probe provided at a movable end of a flexible cantilever having the movable end and a base end as both ends, the scanning probe microscope comprising:
    a) a measurement light-casting section configured to cast light onto a reflective surface provided on the movable end;
    b) a light-detecting section configured to detect reflected light from the reflective surface with a light-receiving surface having a larger area than an incident area of the reflected light, the light-receiving surface divided into a plurality of areas;
    c) a deflection-calculating section configured to determine an amount of deflection of the cantilever based on a proportion of amounts of light incident on the plurality of areas during an accurate measurement of a short-range force acting between the cantilever and the sample;
    d) a determining section configured to determine whether or not an amount of change in the deflection of the cantilever relative to a distance between the base end of the cantilever and the sample is equal to or larger than a previously determined threshold; and
    e) an incident position-changing section configured to change an incident position of the reflected light on the light-receiving surface so as to offset the amount of change when the amount of change is smaller than the threshold.

2. The scanning probe microscope according to claim 1, wherein the incident position-changing section is configured to offset the amount of change by changing the position of the light-receiving surface.

3. The scanning probe microscope according to claim 1, wherein
    the deflection-calculating section is configured to periodically determine the amount of deflection of the cantilever with a first period; and
    the determining section is configured to periodically determine, with a second period longer than the first period, whether or not the amount of change in the deflection of the cantilever relative to the distance between the base end of the cantilever and the sample is equal to or larger than the previously determined threshold.

* * * * *